(12) United States Patent
Hills et al.

(10) Patent No.: US 10,343,199 B2
(45) Date of Patent: Jul. 9, 2019

(54) PRODUCTION OF SECONDARY AGGREGATES

(75) Inventors: Colin Douglas Hills, Kent (GB); Paula Jillian Carey, Kent (GB)

(73) Assignee: UNIVERSITY OF GREENWICH, London (GB)

(*) Notice: Subject to any disclaimer, the term of this patent is extended or adjusted under 35 U.S.C. 154(b) by 1460 days.

(21) Appl. No.: 12/280,088

(22) PCT Filed: Feb. 21, 2007

(86) PCT No.: PCT/GB2007/050077
§ 371 (c)(1),
(2), (4) Date: Oct. 23, 2008

(87) PCT Pub. No.: WO2007/096671
PCT Pub. Date: Aug. 30, 2007

(65) Prior Publication Data
US 2009/0104349 A1   Apr. 23, 2009

(30) Foreign Application Priority Data
Feb. 21, 2006 (GB) .................................. 0603443.3

(51) Int. Cl.
*B09B 3/00* (2006.01)
*B09C 1/08* (2006.01)
*C04B 18/02* (2006.01)

(52) U.S. Cl.
CPC .............. *B09B 3/0041* (2013.01); *B09C 1/08* (2013.01); *C04B 18/021* (2013.01); *Y02W 30/92* (2015.05); *Y02W 30/95* (2015.05)

(58) Field of Classification Search
CPC ..................... B09B 3/0041; C04B 18/021
(Continued)

(56) References Cited

U.S. PATENT DOCUMENTS 4,013,442 A * 3/1977 Kawar ..................... B01J 2/006
427/180
4,402,891 A * 9/1983 Kachinski, Jr. ........ C04B 18/162
264/117
(Continued)

FOREIGN PATENT DOCUMENTS

DE  2652107       6/1977
DE  10307780      9/2004
DE  10307780 A1 * 9/2004 ............. C04B 18/04

OTHER PUBLICATIONS

Ferraris, Concrete Mixing Methods and Concrete Mixers: State of the Art, Journal of Research of the National Institute of Standards and Technology, vol. 106, No. 2, p. 391-399, Mar.-Apr. 2001.*

*Primary Examiner* — Tabatha L Penny
(74) *Attorney, Agent, or Firm* — Heslin Rothenberg Farley & Mesiti P.C.

(57) ABSTRACT

Secondary aggregates are prepared from inert waste fines, from, for example, quarrying and combustion processes, using a combination of accelerated carbonation and tumbling, such that aggregate particles composed of successive layers of solid carbonate-based reaction products form a hard aggregate suitable for use in concrete. The process may carried out by loading the starting materials, and if necessary, water into a cylindrical drum that is rotatable about its horizontal axis, and the interior is charged with a carbon dioxide atmosphere, or mounted within a larger vessel that holds a carbon dioxide atmosphere. Aggregates are formed as coatings on core particles as tumbling proceeds, and the coatings are hardened by in situ formation of carbonates by reaction with the carbon dioxide.

27 Claims, 3 Drawing Sheets

(58) Field of Classification Search
USPC .......................................................... 427/212
See application file for complete search history.

(56) References Cited

U.S. PATENT DOCUMENTS

| | | | | |
|---|---|---|---|---|
| 4,636,342 A | * | 1/1987 | Miyashita | C22B 1/2413 |
| | | | | 264/82 |
| 4,715,965 A | * | 12/1987 | Sigerson | B09C 1/06 |
| | | | | 110/346 |
| 4,950,409 A | | 8/1990 | Stanforth | |
| 5,200,033 A | * | 4/1993 | Weitzman | B09B 3/0041 |
| | | | | 159/16.1 |
| 5,997,629 A | * | 12/1999 | Hills | B09C 1/08 |
| | | | | 106/692 |

* cited by examiner

PRODUCTION OF SECONDARY AGGREGATES

CROSS-REFERENCE TO RELATED APPLICATIONS

This application is the National Stage of International Application No. PCT/GB2007/050077, filed on Feb. 21, 2007, which claims the priority of Great Britain Application No. 0603443.3, filed on Feb. 21, 2006. The contents of both applications are hereby incorporated by reference in their entirety.

FIELD OF THE INVENTION

This invention relates to the production of secondary aggregates by combined carbonation and tumbling of inert waste fines, such as residues from quarrying and combustion processes.

BACKGROUND OF THE INVENTION

Previous work by the inventors, which is the subject of U.S. Pat. No. 5,997,629, proposed treatment of waste by accelerated carbonation to form, by non-hydraulic hardening, non-leaching granulates in which harmful components of the waste are embedded. This treatment involves the use of mixing equipment, such as planetary mixers, to mechanically activate the reactive components of the medium to be carbonated through thorough mixing, and the removal of reaction products to expose fresh reactive surfaces.

Pressure on primary aggregate resources has lead to research into the production of secondary aggregates from inert and non-hazardous wastes, such as from sintered mixtures of clay and ash, which can be used in the production of concrete-based materials.

For example, the commercially available product Aardelite® is manufactured using the pozzolanic properties of residues such as fly-ash. By adding a binder to the residue, for example lime, and processing at a temperature of 90° C., the silica and alumina in the residue are transformed into cementitious minerals.

SUMMARY OF THE INVENTION

The present invention is based on the finding that secondary aggregates can be prepared from inert waste fines from, for example, quarrying and combustion processes, using a combination of accelerated carbonation and tumbling, such that aggregate particles composed of successive layers of solid carbonate-based reaction products form a hard aggregate suitable for use in concrete after only minutes of exposure to carbon dioxide.

Accordingly the present invention provides a process for the preparation of aggregates useful in the manufacture of concrete, comprising tumbling $CO_2$-reactive i.e. carbonatable, fines, or inert fines and a $CO_2$-reactive i.e. carbonatable, binder in the presence of moisture and carbon dioxide, and optionally adding further fines and or binder until the aggregate reaches a size suitable for its intended use.

The process may be operated by tumbling single loads, or by batchwise addition of materials during the tumbling process, or by continuous feeding of carbonatable materials with continuous removal of aggregated product.

BRIEF DESCRIPTION OF THE DRAWINGS

In FIGS. 2-6, the samples are imaged on a paper sheet printed with grid of 1 cm squares.

DETAILED DESCRIPTION OF THE INVENTION

Figure 1:
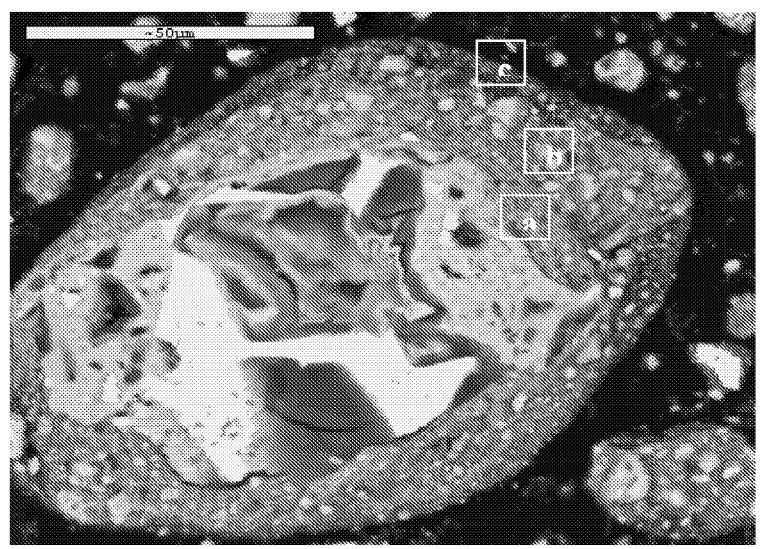
FIG. 1 is an electron photomicrograph showing build-up of carbonate reaction products in layers.

The present invention is a departure from the mixing required to implement the carbonation process of U.S. Pat. No. 5,997,629, in that it involves a tumbling action, typically by use of a rotating drum or tray. In this invention, when materials that are susceptible to accelerated carbonation are mixed with inert wastes/fines such as quarry or washing fines, the mixture is hardened in a $CO_2$-rich gaseous environment, but in a way such that a series of successive layers of hardened material are formed (by the tumbling action) to produce a hard aggregated product, suitable as a replacement for stone, or sintered aggregate in for example, concrete articles.

Also, unlike in U.S. Pat. No. 5,997,629 where materials are added in bulk and then processed in a $CO_2$ rich atmosphere, in this invention the materials are added to the tumbling system more sparingly, and water content is closely controlled to enable successive layers of reaction products/carbonate cement to build up on previous layers, to form a monolithic aggregated product. The accumulation of successive layers of carbonate cement that form the aggregate occurs during the short time that materials are exposed to $CO_2$. Experiments have shown that the $CO_2$ reactive components of the materials being carbonated can achieve up to 97% of their theoretical values during the processing by simple means that includes a modicum of mechanical activation energy.

Carbonatable fines that may be used in this process include certain quarry fines, such as limestone rock crusher fines, paper sludge combustion fines, pulverised fuel ash and cement kiln dust, also mine tailings, silt from storage ponds, dredged sediment and industrially generated processing fines.

Carbonatable binders that may be used in this process include cement kiln dust and Portland cement, and $CO_2$ reactive materials such as quicklime, combustion ashes containing free lime and calcium silicate, or magnesium based minerals. Advantageously, Portland cement, that is deemed "out-of-date" for concrete manufacture may be used in this invention.

Non-carbonatable fines that may be used in this process include certain quarry fines, sand and silt.

Other residues usable in the invention are paper ash, steel sludge, quarry silt, wood ash and expanded clay.

For carbonation to take place, the carbonatable materials suitably contain calcium or magnesium compounds, although carbonation can also occur with other metal compounds such as iron compounds.

The controlled addition of materials and moisture content at which carbonation occurs, are important factors in the production of aggregates by accelerated carbonation. It is important to stress that the rapid development of strength that occurs during exposure to carbon dioxide gas in only minutes is unlike that of hydraulic cement-based systems, which harden over much longer time periods i.e. several hours.

Small amounts of water are required to enable the carbon dioxide to react with the carbonatable materials. The amount of water required is much less than is used for hydraulic setting of Portland cement (hence the use of the term "moisture") and it may well be that the moisture content of the fines is sufficient for the carbonation reaction to take place. If not, then water is added to achieve a weight ratio to solids of not more than 0.5:1, possibly not more than 0.4:1 or 0.3:1. Suitably the water to solids ratio is at least 0.01:1 typically at least 0.1 or 0.2:1. The water to solids ratio may be assessed as an overall value for the process. In a continuous process the indicated water to solids ratio is preferably observed for the feed materials throughout the process. Also, in a batchwise process the indicated water to solids ratio is preferably observed for each batch of material added to the tumbler while building up a layer structure for the aggregate.

Suitably the process of the invention is carried out in an atmosphere that has a carbon dioxide content greater than that of natural air, for example containing at least 20%, 30% or 40% by weight carbon dioxide. Preferably carbon dioxide is the predominant component of the tumbling atmosphere, that is at 50%, 60%, 70% or 80% by weight. Most preferably the atmosphere substantially consists of carbon dioxide, that is at 90%, 95% or 99% by weight. Waste combustion gases with a high content of carbon dioxide may be suitable as the tumbling atmosphere.

The carbonation step is preferably carried out at or around atmospheric pressure, or up to a pressure not exceeding 30 psi (2 bar). The use of a $CO_2$ atmosphere at higher pressure does not greatly advance the process and requires more complex apparatus. The tumbled materials are able to combine with $CO_2$ in the presence of moisture, at ambient temperature and pressure. It is not usually necessary or desirable to employ heating or cooling during the tumbling.

It is preferred that the aggregate product does not retain hydraulic properties. Furthermore the product is preferably essentially non-hydrated in that the aggregate layers are formed by non-hydraulic hardening due to reaction with carbon dioxide.

The carbon dioxide used may be supplied from conventional sources of liquid or pressurised carbon dioxide. Alternatively, $CO_2$ rich gases discharged or recycled from processes such as cement making, or as combustion waste gases, may be used with the simultaneous environmental benefits of reducing greenhouse gas emissions.

Suitably the process is carried out by loading the starting materials into a cylindrical drum that is rotatable about an axis that is horizontal or slightly inclined to the horizontal. The cylinder may be sealed at both ends so that its interior may be charged with a carbon dioxide atmosphere, or mounted within a larger vessel that holds a carbon dioxide atmosphere. On rotation of the drum, the material resting at the lowest point of the cylinder begin to "climb" the cylinder wall and then tumble back to the lowest level under gravity. Aggregates are formed as coatings on core particles as the tumbling proceeds, and the coatings are hardened by in situ formation of carbonates by reaction with the carbon dioxide.

When the drum is rotating about a horizontal axis the materials to be treated, and optionally water, may be added to the drum as a single batch or in more than one portion. The load, or each portion, is drummed until suitably hardened and, if necessary with addition of another portion, until the desired size is reached for use as an aggregate in concrete manufacture or, for example, as road-stone or gravel substitute.

When the rotational axis is inclined to the horizontal, the load is able to pass down the incline during rotation. The angle of inclination and the length of the drum is selected so that the time of travel of a load added at the higher end of the drum is such that it is aggregated to a suitable size as it discharges from the lower end of the drum. In this procedure, the materials may be added as a single load, or more preferably as a continuous supply. This process may be carried out in a static $CO_2$ atmosphere or by circulating a $CO_2$ rich atmosphere through the drum.

Alternatively, the process may be carried out using rotating pelletising pans or trays having a circular base and an upstanding peripheral wall around the circumference of the base. The base of the tray or pan may be horizontal, or inclined to the horizontal so that a tumbling action is imparted by the movement of the wall, as well as of the base.

In both the drum or tray form of apparatus, upstanding fillets may be provided on the surfaces in contact with the materials to be carbonated, to promote tumbling and to avoid the possibility that materials slide without tumbling.

As an illustration only, an intermediate scale plant may be based on a tumbler drum of 1.5 m diameter×4.0 m length with its main axis at an inclination of 1-5 degrees from the horizontal. Operating at 1-5 RPM and velocity of 0.08-0.4 m/s, it is anticipated that a continuous feed of 1000-5000 kg/hr is feasible with a process time of 10 to 30 minutes, depending on waste. Such an apparatus may be mounted on pairs of rollers or wheels, which support the drum while allowing it to rotate. The drum may be rotated by a motor which drives one or more of the support rollers or wheels. This pilot scale plant may be scaled up in conventional manner for larger throughputs on an industrial scale, for example around 100 tonnes/hour.

The procedures of the invention are illustrated by the following experimental work.

EXPERIMENTAL

In the work reported below, the $CO_2$-reactive component used was principally out-of-date Portland cement. However, cement-kiln dusts, flue dusts and slag can also be used in the process of the invention, as seen in the Examples, in which aggregates are produced using a rotary drum mixer with a tumbling/rolling action. The Examples 1-5 make use of a tumbler drum of 0.2 m diameter×0.2 m length with its rotational axis horizontal. The tumbler is driven at 2-50 RPM and velocity of 0.21-0.52 m/s for a process time of 10 to 30 minutes, depending on waste. Each Example was carried out with a 300 g batch of the treated waste. For $CO_2$ treatment, the tumbler was charged with $CO_2$ gas from a laboratory gas cylinder filled with a regulator. A vent in the tumbler allowed the original air to be flushed out while maintaining the internal pressure at around atmospheric.

The finished aggregates display an ooidal-like structure composed of successive layers of carbonate reaction products. The carbonate reaction products may be calcium or magnesium based, or might be composed of other elements such as iron.

The start of the build-up of carbonate reaction products in distinct layers on a grain of $CO_2$ reactive cement waste is shown in FIG. 1. FIG. 1 is an electron micrograph of a partially carbonated grain containing calcium silicates. After tumbling carbonation by the present invention distinct layers of calcium carbonate are formed on surface of original grain boundary. In FIG. 1 three distinct layers of carbonate (a-c) can be clearly observed on the top right side of the image of the grain. The area marked (a) is the relict structure of the original grain, whereas the area (b) is the first layer of carbonate formed of material on the immediate surface of the grain, and the area (c) shows a different layer, accreting on the outside of the grain. It is this layer (c) which continues to form and harden in the tumbling action described, with controlled addition of parent materials.

Table 1 gives a summary of the typical range in bulk properties of aggregates produced by accelerated carbonation.

TABLE 1

Typical values of the bulk physical properties of accelerated carbonated aggregates

| | Bulk dry density ($kg/m^3$) | Saturated bulk density ($kg/m^3$) | Water absorption (%) | Hardness/ Strength (MPa)* | Carbonation time (mins.) |
|---|---|---|---|---|---|
| Property | 600-1100 | 700-1300 | 5-25 | 0.25-3 | 10-30 |

*measured as typical of individual particles under constant load

EXAMPLES

In the samples below strength determinations were made in comparison with a proprietary expanded clay aggregate (LECA—Lightweight Expanded Clay Aggregate), commonly used in the production of light weight blocks. LECA products are prepared by firing clay pellets in a rotary kiln at about 1200° C. Relative strengths of the products are described as weaker, similar, stronger and significantly stronger, relative to LECA. The chemical values present in the fines/binder used in each Example are set out in Table 2 following the Examples.

Example 1

Paper Combustion Ash

| Paper combustion Ash | |
|---|---|
| Primary Waste: | Sludge Ash |
| Other | 10% waste PC* |
| Water:solid ratio: | 0.5 |
| Mixing/carbonation time: | 10 minutes |
| Dry bulk density: | 728 kg/m$^3$ |
| Saturated bulk density: | 962 kg/m$^3$ |
| Water absorption: | 23% |
| Strength: | significantly stronger |

*in these examples 'out of date' Portland cement was used

Figure 2:
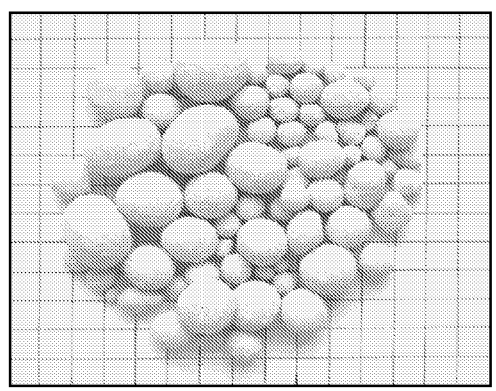
FIG. 2 is a photograph showing a sample of the product of Example 1.

A sample of the product is shown in FIG. 2.

Example 2

Rock Crusher Fines

| Limestone crusher fines | |
|---|---|
| Primary waste: | Limestone fines |
| Other: | Paper ash/Kiln dust |
| Water:solid ratio: | 0.3 |
| Mixing/carbonation time: | 10 minutes |
| Dry bulk density: | 913 kg/m$^3$ |
| Saturated bulk density: | 1095 kg/m$^3$ |
| Water absorption: | 15% |
| Strength: | significantly stronger |

Figure 3:
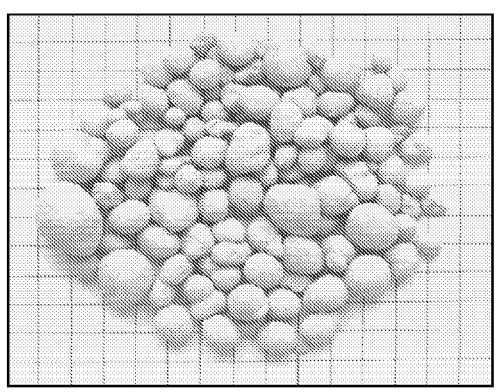
FIG. 3 is a photograph showing a sample of the product of Example 2.

A sample of the product is shown in FIG. 3

Example 3

Sand/Silt Fines

| Sand/silt fines | |
|---|---|
| Primary waste: | Low quality sand |
| Binder: | 40% waste PC/by-pass dust |
| Water:solid ratio: | 0.3 |
| Mixing/carbonation time: | 20-30 minutes |
| Dry bulk density: | 942 kg/m$^3$ |
| Saturated bulk density: | 1132 kg/m$^3$ |
| Water absorption: | 15% |
| Strength: | similar |

Figure 4:
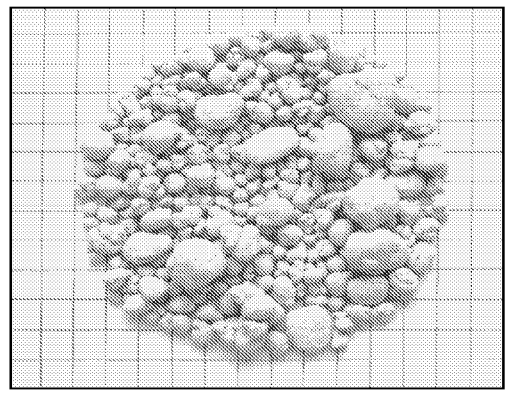
FIG. 4 is a photograph showing a sample of the product of Example 3.

A sample of the product is shown in FIG. 4.

Example 4

Pulverised Fuel Ash (PFA)

| Pulverised fuel ash | |
|---|---|
| Waste: | PFA |
| Binder: | 20% waste PC |
| Water:solid ratio: | 0.27 |
| Mixing/carbonation time: | 30 minutes |
| Dry bulk density: | 599 kg/m$^3$ |
| Saturated bulk density: | 695 kg/m$^3$ |
| Water absorption: | 5% |
| Strength: | lower |

Figure 5:
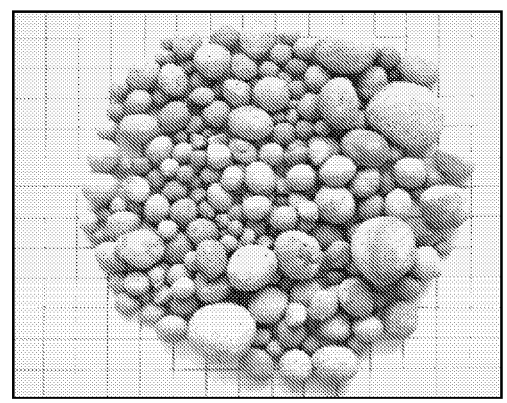
FIG. 5 is a photograph showing a sample of the product of Example 4.

A sample of the product is shown in FIG. 5.

Example 5

Cement Kiln Dust

| Cement Kiln Dust (CKD) | |
|---|---|
| Primary waste: | CKD + Limestone/ |
| Other: | Waste PC |
| Water:solid ratio: | 0.27 |
| Mixing/carbonation: | 10 minutes |
| Dry bulk density: | 771 kg/m$^3$ |
| Saturated bulk density: | 919 kg/m$^3$ |
| Water absorption: | 17% |
| Strength: | significantly stronger |

Figure 6:
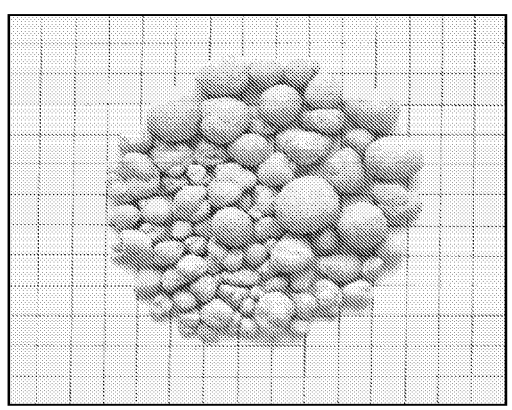
FIG. 6 is a photograph showing a sample of the product of Example 5.

A sample of the product is shown in FIG. 6.

TABLE 2

|  | $SO_3$ | $Na_2O$ | $SiO_2$ | $Al_2O_3$ | $Fe_2O_3$ | CaO | L.O.I | MgO | $K_2O$ | $P_2O_5$ | $TiO_2$ | MnO | Cl | $CaCO_3$ | Minor |
|---|---|---|---|---|---|---|---|---|---|---|---|---|---|---|---|
| Bypass Dust | 9.05 | 1.39 | 14.37 | 4.85 | 2.19 | 58.81 | 3.21 | 1.12 | 1.89 | — | — | — | 0.32 | | |
| Portland Cement | 3.5 | 0.14 | 19.53 | 5.07 | 3.04 | 63.54 | | 1.3 | 0.87 | — | — | — | | | |
| Cement Kiln Dust | 7.13 | 1.60 | 11.20 | 3.36 | 2.20 | 49.15 | 19.62 | 1.74 | 4.14 | 0.09 | — | — | 2.48 | | |
| Limestone | | | | | | | | | | | | | | >90 | <10 |
| Paper Ash | 0.19 | 0.28 | 25.9 | 15.8 | 0.5 | 42.7 | 6.39 | 3.06 | 0.3 | 0.2 | 0.19 | 0.1 | | | |
| Pulverised Fuel Ash | 0.45 | — | 47.34 | 27.01 | 10.55 | 4.46 | 0.79 | 1.48 | 3.50 | — | 1.00 | — | — | | |

The invention claimed is:

1. A process for the preparation of aggregates suitable for use in concrete manufacture, the process comprising tumbling carbonatable fines, or inert fines and a carbonatable binder, in the presence of water at a weight ratio to solids of not more than 0.5:1 and an atmosphere containing at least 40% by weight carbon dioxide such that the carbonatable materials and the carbon dioxide react as the tumbling proceeds to form distinct successive layers of hardened carbonates around core particles, in which the layers are formed by non-hydraulic hardening due to reaction with carbon dioxide, wherein water is added as a single batch or in more than one portion, wherein the aggregates are essentially non-hydrated, and wherein a carbonation time is in a range of from 10 minutes to 30 minutes.

2. The process according to claim 1 in which the carbonatable fines are paper sludge combustion fines, pulverised fuel ash, cement kiln dust or out-dated Portland Cement.

3. The process according to claim 2 in which water is present at a weight ratio to solids of at least 0.01:1 and not more than 0.5:1.

4. The process according to claim 2 in which the materials are tumbled in an atmosphere consisting predominantly of carbon dioxide.

5. The process according to claim 2 in which the materials are tumbled in a cylindrical drum.

6. The process according to claim 1 in which the inert fines are quarry fines, sand or silt.

7. The process according to claim 6 in which the carbonatable binder is cement kiln dust or Portland cement.

8. The process according to claim 7 in which water is present at a weight ratio to solids of at least 0.01:1 and not more than 0.5:1.

9. The process according to claim 7 in which the materials are tumbled in an atmosphere consisting predominantly of carbon dioxide.

10. The process according to claim 7 in which the materials are tumbled in a cylindrical drum.

11. The process according to claim 6 in which water is present at a weight ratio to solids of at least 0.01:1 and not more than 0.5:1.

12. The process according to claim 6 in which the materials are tumbled in an atmosphere consisting predominantly of carbon dioxide.

13. The process according to claim 6 in which the materials are tumbled in a cylindrical drum.

14. The process according to claim 1 in which water is present at a weight ratio to solids of at least 0.01:1.

15. The process according to claim 14 in which the materials are tumbled in a cylindrical drum.

16. The process according to claim 1 in which the materials are tumbled in an atmosphere consisting predominantly of carbon dioxide.

17. The process according to claim 16 in which the materials are tumbled in a cylindrical drum.

18. The process according to claim 1 in which the materials are tumbled in a cylindrical drum.

19. The process according to claim 18 in which the cylindrical drum rotates about a horizontal axis and materials are processed batchwise.

20. The process according to claim 19 comprising adding further fines, binder, water, or any combination of the aforementioned until the aggregate reaches a size suitable for its intended use.

21. The process according to claim 18 in which the cylindrical drum rotates about an axis inclined to the horizontal and materials are processed batchwise or continuously.

22. The process according to claim 1 in which the materials are tumbled in an atmosphere wherein carbon dioxide is a predominant component.

23. The process according to claim 1 in which the materials are tumbled in a cylindrical drum rotated at a circumferential velocity of 0.08 to 0.52 ms$^{-1}$.

24. The process according to claim 23 in which the circumferential velocity is 0.21 to 0.4 ms$^{-1}$.

25. The process of claim 1, wherein water is present at a weight ratio to solids of at least 0.01:1 and not more than 0.4:1.

26. The process of claim 1, wherein water is present at a weight ratio to solids of at least 0.01:1 and not more than 0.3:1.

27. The process of claim 1, wherein the process for the preparation of aggregates is performed at an ambient temperature.

* * * * *